United States Patent
Takayama et al.

(10) Patent No.: US 6,597,140 B2
(45) Date of Patent: Jul. 22, 2003

(54) SENSORLESS MOTOR STARTING SYSTEM

(75) Inventors: Seiryu Takayama, Kanagawa (JP); Takao Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 86 days.

(21) Appl. No.: 09/901,272

(22) Filed: Jul. 9, 2001

(65) Prior Publication Data

US 2002/0003412 A1 Jan. 10, 2002

(30) Foreign Application Priority Data

Jul. 10, 2000 (JP) ..................... P2000-208708

(51) Int. Cl.[7] .............................................. H02P 6/02
(52) U.S. Cl. ....................... 318/445; 318/138; 318/254; 318/439; 318/599; 318/778; 318/779
(58) Field of Search ................ 318/138, 254, 318/439, 445, 599, 778, 779

(56) References Cited

U.S. PATENT DOCUMENTS

| | | | |
|---|---|---|---|
| 4,916,701 A | | 4/1990 | Eggenberger et al. |
| 5,225,759 A | * | 7/1993 | Endo et al. ................. 318/778 |
| 5,298,838 A | * | 3/1994 | Peters et al. ................ 318/138 |
| 5,396,159 A | * | 3/1995 | Kaneda ....................... 318/431 |
| 5,428,284 A | * | 6/1995 | Kaneda et al. .............. 318/778 |
| 5,627,441 A | * | 5/1997 | Sakurai et al. .............. 318/599 |
| 5,650,699 A | * | 7/1997 | Tang et al. .................. 318/431 |
| 5,703,449 A | * | 12/1997 | Nagate et al. .............. 318/254 |
| 5,717,299 A | * | 2/1998 | Imagaki et al. ............. 318/254 |
| 5,726,543 A | * | 3/1998 | Park et al. .................. 318/254 |
| 5,841,252 A | * | 11/1998 | Dunfield .................... 318/254 |
| 5,886,486 A | * | 3/1999 | Jeong et al. ................ 318/254 |
| 5,901,268 A | * | 5/1999 | Ando et al. ................. 388/811 |
| 6,100,656 A | * | 8/2000 | El-Sadi et al. ............. 318/254 |

FOREIGN PATENT DOCUMENTS

| | | | | |
|---|---|---|---|---|
| JP | 04-317585 | * | 11/1992 | ............. H02P/6/02 |
| JP | 2002-27782 | * | 1/2002 | ............. H02P/6/02 |

OTHER PUBLICATIONS

IEEE Transactions on Information Theory, vol. 38, No. 6., November 1992.

* cited by examiner

Primary Examiner—Robert E. Nappi
Assistant Examiner—Tyrone Smith
(74) Attorney, Agent, or Firm—Frommer Lawrence & Haug LLP; William S. Frommer

(57) ABSTRACT

A sensorless motor starting system of a simplified structure is capable of starting a sensorless spindle motor under optimal target starting conditions with low power consumption in accordance with the motor type and the kind of an optical disc to be driven, by executing manual fine adjustment of start parameters in response to any abnormal rotation caused at the start time. In this system, a rotation frequency signal is outputted from an edge detector on the basis of position signals in a start acceleration mode, and then is compared with a reference frequency signal by a comparator. And if the result of the decision therefrom signifies abnormal rotation, a switch is turned to its another terminal to select a manual setting mode. An operator performs manual fine adjustments of a phase switching time, a phase switching number and a drive voltage in order while monitoring phase switching control signals and position signals to thereby normalize the start state of the sensorless spindle motor. Consequently, the spindle motor can be started under the target conditions in compliance with any characteristic change of the motor and the characteristic of the driver.

2 Claims, 4 Drawing Sheets

SENSORLESS MOTOR STARTING SYSTEM

BACKGROUND OF THE INVENTION

The present invention relates to a sensorless motor starting system to start a sensorless motor under optimal starting conditions in accordance with the characteristics thereof and a load to be driven.

A brushless motor, which comprises a permanent magnet rotor and a coil for generating a field and has a long service life with excellent noiseless and dustless characteristics, is used as a spindle motor to drive and rotate an optical disc such as CD (Compact Disc) or MD (Mini Disc) on its axis. Further, there is employed a sensorless motor rotatable by a coil-induced voltage instead of a Hall element signal in a brushless motor.

For example, in a conventional portable MD signal processing LSI using a sensorless motor as a spindle motor, spindle motor start parameters (phase switching time, phase switching number, drive voltage) are kept fixed, and it is impossible to adjust such start parameters.

There is known a case where, depending on a motor driver, the phase switching time and the phase switching number are adjusted on the motor driver side. In such a case, however, the operation is complicated and the loss in power consumption is rendered greater, since such adjustment is executed by supplying a servo output of the spindle motor as an analog signal to the motor driver.

In a sensorless motor starting system for driving an optical disc such as MD, CD or DVD (Digital Versatile Disc), it is requisite to achieve high-precision rotation of the sensorless motor at a desired speed with low power consumption by adjusting the start parameters (phase switching time, phase switching number, drive signal) in a manner to exactly conform with delicate characteristic changes of the sensorless motor or characteristic variations of the driver.

SUMMARY OF THE INVENTION

The present invention has been accomplished in view of the current circumstances of the sensorless motor starting system mentioned above. And it is an object of the invention to provide an improved sensorless motor starting system of a simplified structure which is capable of solving the problems relative to slight changes in the sensorless motor characteristics or variations in the driver characteristics by detecting the initial rotation state of the sensorless motor and executing fine adjustment of the start parameters directly in accordance with requirements, hence starting the sensorless motor under optimal target starting conditions while minimizing the power consumption in conformity with the type of the motor and the load to be driven.

According to one aspect of the present invention, there is provided a sensorless motor starting system which comprises a mode setting means for selectively setting either a start acceleration mode or a fixed frequency mode for the sensorless motor; an automatic parameter setting means for setting, in the sensorless motor, start parameters to specify the start-time driving conditions preset correspondingly to the motor characteristic and a load to be driven; an automatic motor starting means for starting the rotation of the sensorless motor in an automatic mode on the basis of the start-time driving conditions specified by the start parameters set by the automatic parameter setting means; a start state decision means for making a decision as to whether the start state of the sensorless motor started by the automatic motor starting means is coincident or not with a target start state; and a start parameter setting mode change means for canceling the start executed by the automatic motor starting means when the result of the decision obtained from the start state decision means signifies a deviation of the sensorless motor start state from the target start state, and then changing the setting of the start parameters to a manual setting mode.

In the structure mentioned above, either a start acceleration mode or a fixed frequency mode is set selectively for the sensorless motor, and in case the start acceleration mode is selectively set, start parameters for specifying the start-time driving conditions preset correspondingly to the motor characteristics and the driven load are set by the automatic parameter setting means. Then the sensorless motor is started and rotated in the automatic mode on the basis of the start-time driving conditions specified by the start parameters set by the automatic parameter setting means, and a decision is made by the start state decision means as to whether the start state of the sensorless motor is coincident or not with the target start state.

And if the result of the decision signifies that the start state of the sensorless motor has a deviation from the target start state, the setting of the start parameters by the automatic starting means is canceled and then is changed to the automatic setting mode, whereby manual adjustment is executed in such a manner that the start parameters give the target start state to the sensorless motor. Thus, the sensorless motor is started by the simplified structure with low power consumption for the load under optimal target start conditions in response to slight changes in the sensorless motor characteristics or variations in the driver characteristics.

In the sensorless motor driving system mentioned above, the start parameters specify a phase switching time, a phase switching number and a drive signal.

Due to such means in the simplified structure, the spindle motor can be started under optimal target start conditions with low power consumption in response to slight changes in the motor characteristics or variations in the driver characteristics correspondingly to the motor characteristics and the kind of an optical disc to be driven.

The above and other features and advantages of the present invention will become apparent from the following description which will be given with reference to the illustrative accompanying drawings.

DESCRIPTION OF THE PREFERRED EMBODIMENT

Figure 1:
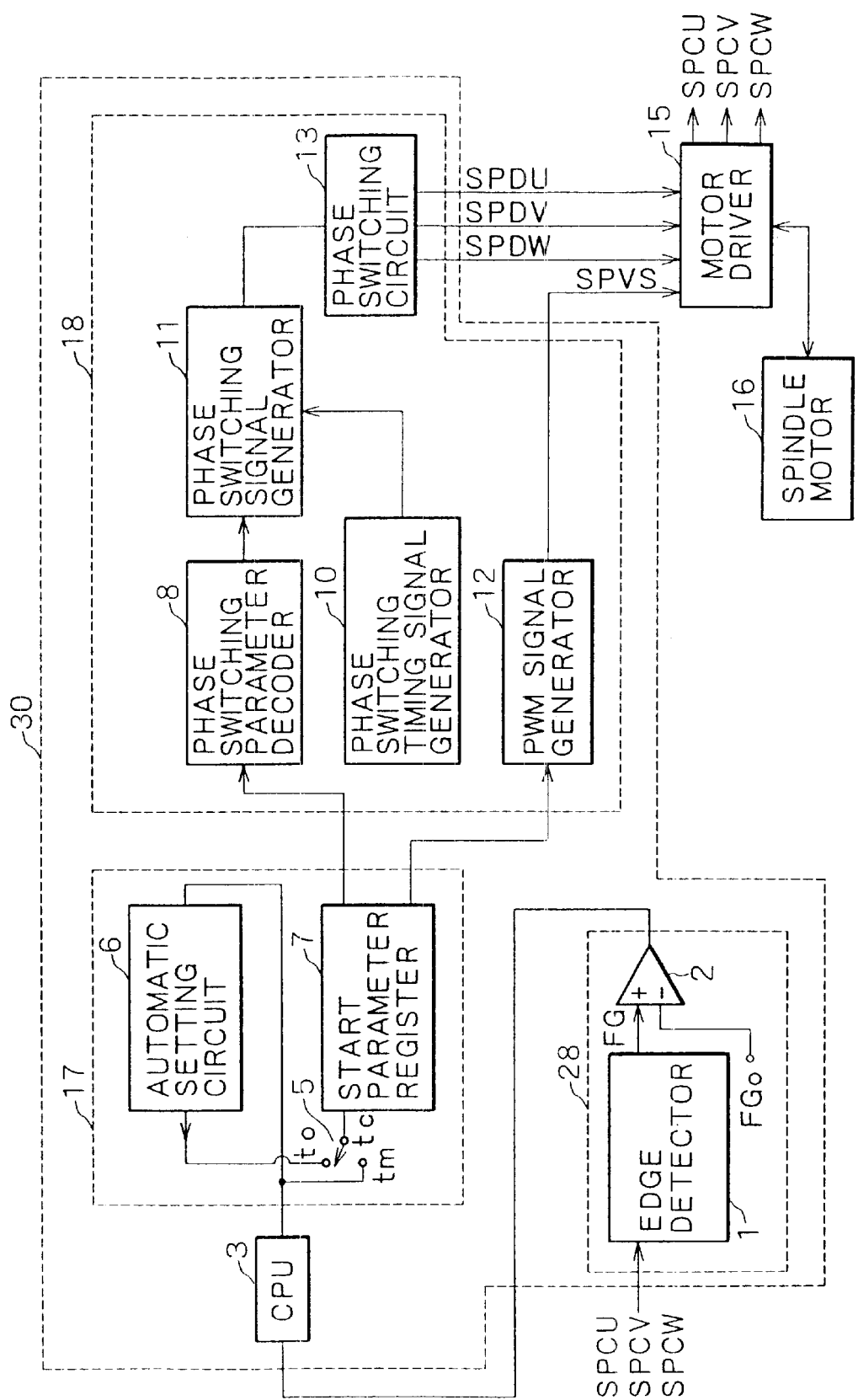
FIG. 1 is a block diagram showing the structure of essential components in an embodiment of the present invention.
Figure 2:
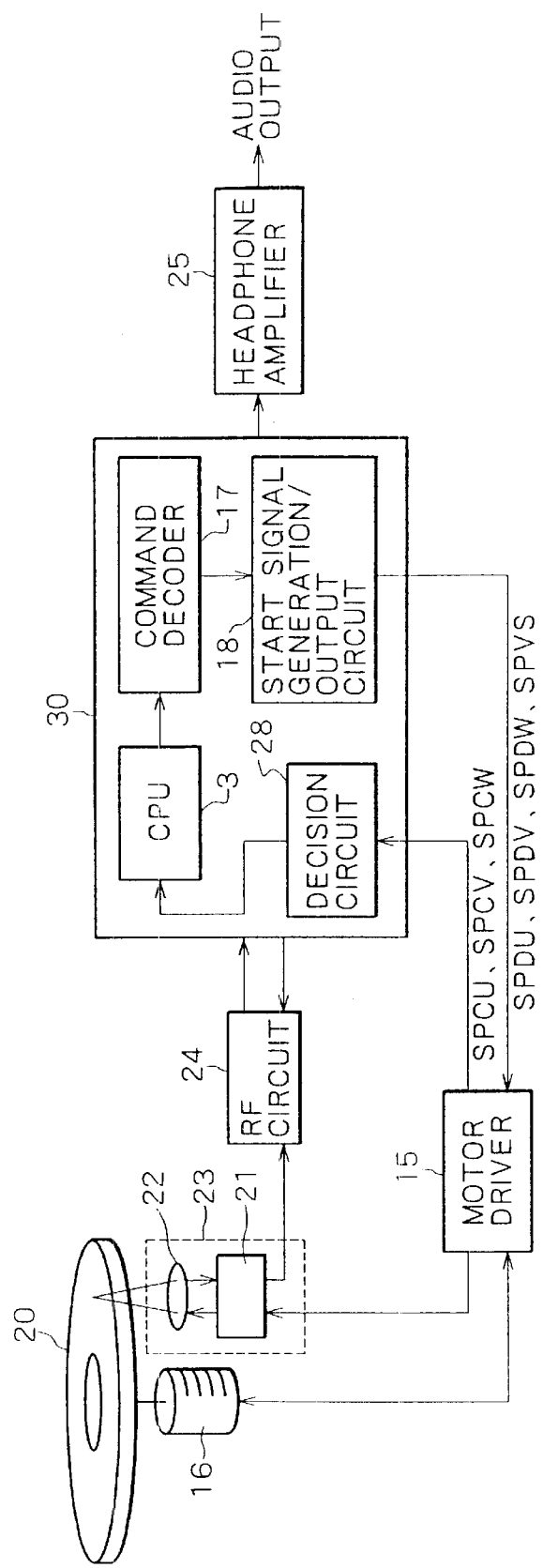
FIG. 2 is an explanatory diagram showing the whole structure of the embodiment applied to rotatory drive of an optical disc.

Hereinafter a preferred embodiment of the present invention will be described in detail with reference to FIGS. 1 to 4.

This embodiment represents an exemplary case where the present invention is applied to rotatory drive of an optical disk. A sensorless motor is used as a spindle motor 16 for driving an optical disc 20 to rotate the same on the axis thereof. The optical disc 20 is an MD (Mini Disc) for example, and a pickup 23 consisting of an objective lens 22 and an optical unit 21 is positioned opposite to the optical disc 20 in the proximity thereof. The optical unit 21 comprises a laser diode and a photo diode.

In this embodiment, a processor unit 30 is provided to perform control of the whole system, wherein the processor unit 30 is connected to a motor driver 15. The motor driver 15 has a function of driving the spindle motor 16 and the pickup 23, and also a function of transferring position signals SPCU, SPCV and SPCW from the spindle motor 16 to the processor unit 30.

An RF circuit 24 and a headphone amplifier 25 capable of outputting an audio signal are connected to the processor unit 30. The RF circuit 24 connected to an output terminal of the optical unit 21 in the pickup 23 has a function of processing the output signal obtained from the optical unit 21.

The processor unit 30 comprises a decision circuit 28 for deciding a deviation of the start drive state of the spindle motor 16 from a preset target start state on the basis of position signals SPCU, SPCV and SPCW; a CPU 3 for controlling the whole operation; a command decoder 17 for decoding and outputting a command to set each start parameter; and a start signal generation/output circuit 18 for generating and outputting a start signal. In the processor unit 30, an output terminal of the decision circuit 28 is connected to the CPU 3, whose output terminal is connected to the command decoder 17, and an output terminal of the command decoder 17 is connected to the start signal generation/output circuit 18.

As shown in FIG. 1, the decision circuit 28 in the processor unit 30 receives the input position signals SPCU, SPCV and SPCW, and then detects and outputs the respective edges of such signals, so that an output terminal of an edge detector 1 for outputting a rotation frequency signal FG of the spindle motor 16 is connected to a non-inverting input terminal of a comparator 2, and a reference frequency signal FGo is supplied to the non-inverting input terminal of the comparator 2.

The output terminal of the comparator 2 is connected to the CPU 3, and the output terminal of the CPU 3 is connected to an automatic setting circuit 6 incorporated in the command decoder 17 for automatically setting start parameters, and also to one terminal tm of a switch 5. Further the output terminal of the automatic setting circuit 6 is connected to another terminal to of the switch 5, whose common terminal tc is connected to a start parameter register 7 which is incorporated in the command decoder 17 and stores the start parameters set therein.

The start signal generation/output circuit 18 comprises a phase switching parameter decoder 8 for decoding phase switching parameters on the basis of start parameters; a phase switching timing signal generator 10 for generating a phase switching timing signal; a phase switching signal generator 11 for generating a phase switching signal from both the output signal of the phase switching parameter decoder 8 and the output signal of the phase switching timing signal generator 10; a PWM signal generator 12 for generating a PWM signal from the start parameters; and a phase switching circuit 13 for outputting phase switching control signals SPDU, SPDV and SPDW. In the start signal generation/output circuit 18, the output terminal of the start parameter register 7 is connected to both the phase switching parameter decoder 8 and the PWM signal generator 12, and the respective output terminals of the phase switching parameter decoder 8 and the phase switching timing signal generator 10 are connected to the phase switching signal generator 11, whose output terminal is connected to the phase switching circuit 13.

The output terminal of the phase switching circuit 13 and the output terminal of the PWM signal generator 12 in the start signal generation/output circuit 18 are connected to the motor driver 15, and the output terminal of the motor driver 15 is connected to the spindle motor 16. The motor driver 15 drives the spindle motor 16 to rotate the same by the phase switching control signals SPDU, SPDV, SPDW and the drive signal SPVS, and has a function of transferring the position signals SPCU, SPCV and SPCW from the spindle motor 16 to the edge detector 1.

Now a description will be given on the operation of the embodiment having the structure mentioned above.

Figure 3:
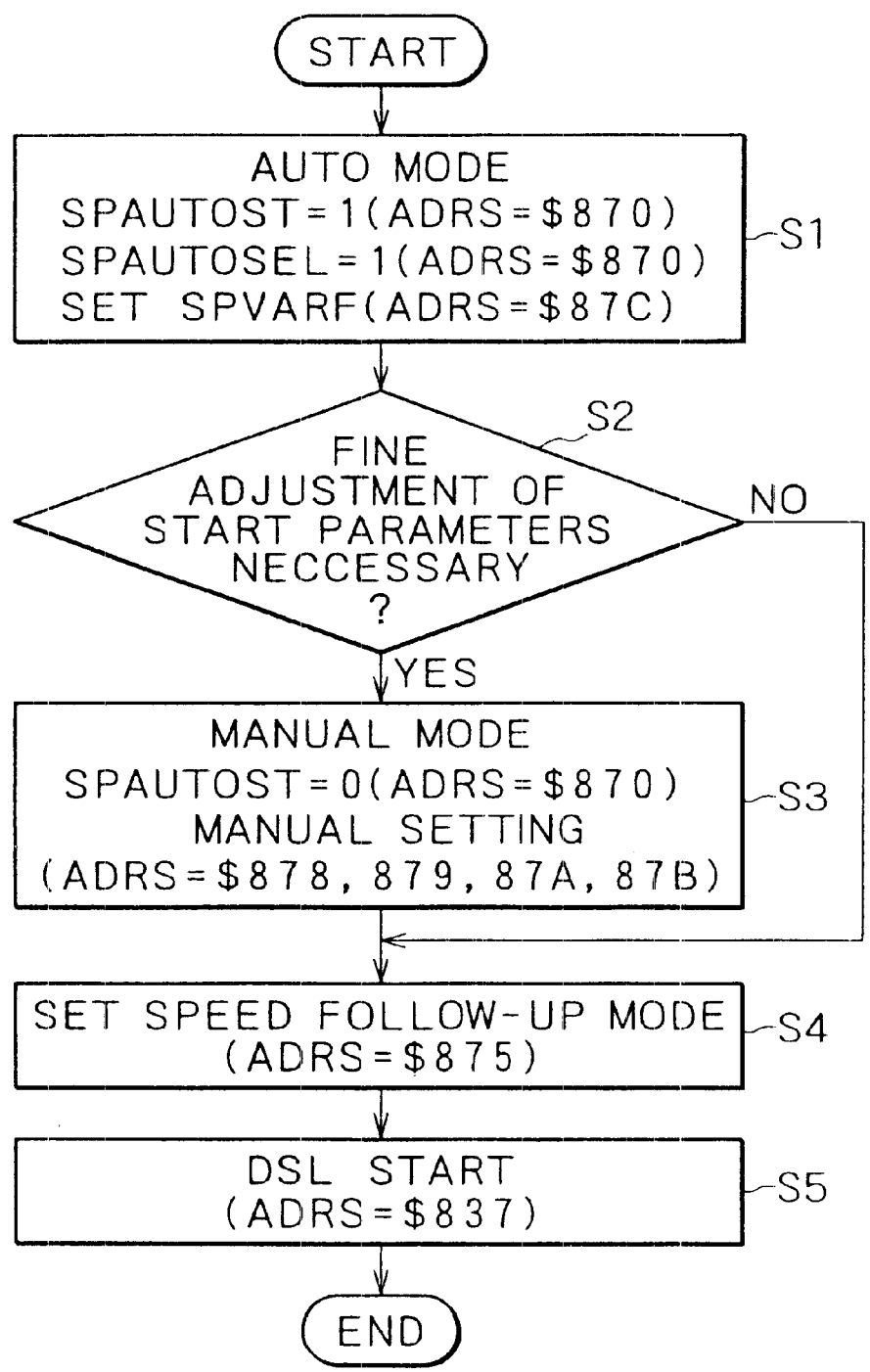
FIG. 3 is a flowchart showing one operation of the embodiment performed in a start acceleration mode.

When the operation of this embodiment is performed in a start acceleration mode shifted to a speed follow-up mode with gradual increase of the rotation speed of the spindle motor 16, first the automatic setting circuit 6 sets, at step S1 in a flowchart of FIG. 3, SPAUTOST=1 (ADRS=$870) in response to a command from the CPU 3, whereby an automatic start mode is selected under the preset conditions for control of the spindle motor 16, and the switch 5 is changed to its terminal to. Then the automatic setting circuit 6 sets SPAUTOSEL=1 (ADRS=$870), whereby a start acceleration mode is selected. Subsequently the automatic setting circuit 6 sets SPVARF (ADRS=$87C) to thereby set a rotational acceleration in the automatic acceleration start mode, so that the preset start parameters in the start acceleration mode preregistered correspondingly to the characteristics of the spindle motor 16 and the kind of the optical disc 20 are outputted from the start parameter register 7.

In this case, the phase switching parameters outputted from the start parameter register 7 are supplied to the phase switching parameter decoder 8, and the drive signal parameters outputted from the start parameter register 7 are supplied to the PWM generator 12, so that the phase switching parameters are decoded by the phase switching parameter decoder 8.

Thereafter in the phase switching signal generator 11, phase switching signals SPDU, SPDV and SPDW are produced in accordance with the decoding signal synchronously with phase switching timing signals obtained from the phase switching timing signal generator 10. Such phase switching signals SPDU, SPDV and SPDW are supplied via the phase switching circuit 13 to the motor driver 15.

Meanwhile in the PWM signal generator 12, a drive signal SPVS produced in accordance with the drive signal parameter from the start parameter register 7 is supplied to the motor driver 15. The motor driver 15 also receives the phase switching signals SPDU, SPDV and SPDW from the phase switching circuit 13 simultaneously with the drive signal SPVS from the PWM signal generator 12, thereby starting the spindle motor 16.

Next the operation proceeds to step S2, where a decision is made, in response to a command from the CPU 3, as to whether fine adjustment of the start parameters are necessary or not. In this decision, the position signals SPCU, SPCV and SPCW are detected from the started spindle motor 16. The position signals SPCU, SPCV and SPCW thus detected are supplied via the motor driver 15 to the edge detector 1, which then detects the respective edges of the position signals and outputs a rotation frequency signal FG of the spindle motor 16.

In the comparator 2, the rotation frequency signal FG is compared with a preset reference frequency signal FGo, and a decision is made as to whether the rotation frequency fg of the spindle motor 16 has reached a reference frequency fgo within a predetermined time after the start. And if the result of this decision signifies that the rotation frequency fg of the spindle motor 16 has not yet reached the reference frequency fgo, an abnormal signal is supplied from the comparator 2 to the CPU 3.

Upon input of the abnormal signal from the comparator 2 to the CPU 3, the operation proceeds to step S3 to set SPAUTOST=0 (ADRS=$870) in response to a command from the CPU 3, whereby the switch 5 is turned to its terminal tm to select a manual setting mode, and simultaneously the spindle motor 16 is brought to a stop.

In the manual setting mode, the operator checks and detects where the rotation of the spindle motor 16 has been rendered abnormal while mutually watching the phase switching control signals SPDU, SPDV, SPDW and the position signals SPCU, SPCV, SPCW on a monitor.

Then the operator first adjusts the phase switching time until initial four-phase switching so as to normalize under control the start of the spindle motor 16. In case the start of the spindle motor 16 fails to be normalized by such adjustment of the phase switching time, the operator performs fine adjustment of the phase switching number to normalize the start of the spindle motor 16. And if the start of the spindle motor 16 still fails to be normalized even by the adjustment of the phase switching number, the operator performs fine adjustment of the drive signal (drive voltage) to thereby recover the normal start state of the spindle motor 16 (ADRS=$878, 879, 87A, 87B).

When the start of the spindle motor 16 is thus reset to its normal state by the manual setting at step S3 or if the result of the decision at step S2 signifies that fine adjustment of the start parameters is not necessary, the operation proceeds to step S4, where a speed follow-up mode is selected by setting ADRS=$875 in response to a command from the CPU 3. Subsequently the operation proceeds to step S5 to set ADRS=$837, so that start parameters for normally starting the spindle motor 16 are outputted from the start parameter register 7.

The phase switching parameters thus outputted are supplied to the phase switching parameter decoder 8 while the signal parameter is supplied to the PWM generator 12. Since the phase switching parameters are decoded by the phase switching parameter decoder 8, phase switching signals SPDU, SPDV and SPDW are produced in the phase switching signal generator 11 synchronously with the phase switching timing signal obtained from the phase switching timing signal generator 10, and then are supplied via the phase switching circuit 13 to the motor driver 15.

Meanwhile in the PWM signal generator 12, a drive signal SPVS, which is produced on the basis of the drive signal parameters obtained from the start parameter register 7, is supplied to the motor driver 15. And the phase switching signals SPDU, SPDV, SPDW from the phase switching circuit 13 and the drive signal SPVS from the PWM signal generator 12 are supplied to the motor driver 15, so that the spindle motor 16 is driven by the motor driver 15 to start its rotation in a normal state.

Figure 4:
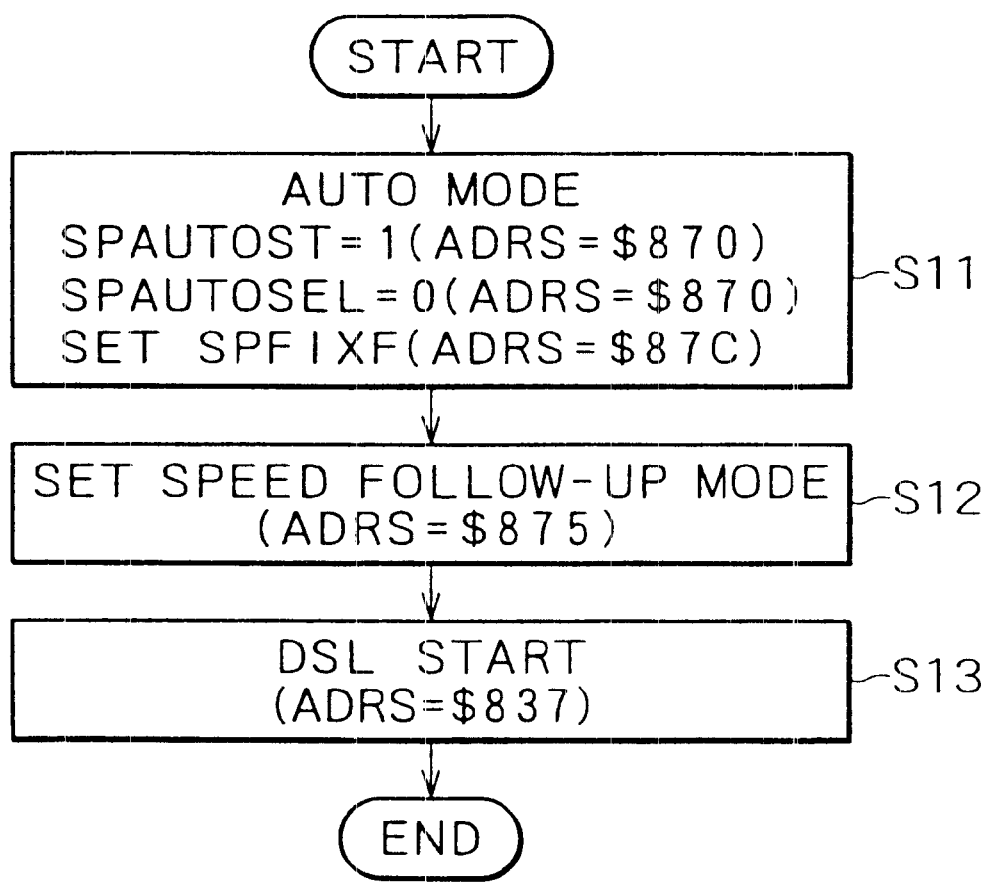
FIG. 4 is a flowchart showing another operation of the embodiment performed in a fixed frequency mode.

When the operation is performed in a specific frequency rotation mode shifted to a speed follow-up mode while rotating the spindle motor 16 at a fixed specific frequency, the automatic setting circuit 6 sets, at step S11 in a flowchart of FIG. 4, SPAUTOST=1 (ADRS=$870) in response to a command from the CPU 3, whereby an automatic start mode is selected under the preset conditions for control of the spindle motor 16, and the switch 5 is turned to its terminal to. Then the automatic setting circuit 6 sets SPAUTOSEL=0 (ADRS=$870), whereby a fixed frequency mode is selected. Subsequently the automatic setting circuit 6 sets SPFIXF (ADRS=$87C) to thereby select a fixed phase switching frequency in the fixed frequency mode, so that the preset start parameters in the fixed frequency mode preregistered correspondingly to the characteristics of the spindle motor 16 and the kind of the optical disc 20 are outputted from the start parameter register 7.

In this case, the phase switching parameters outputted from the start parameter register 7 are supplied to the phase switching parameter decoder 8, and the drive signal parameters outputted from the start parameter register 7 are supplied to the PWM generator 12, so that the phase switching parameters are decoded by the phase switching parameter decoder 8. Thereafter in the phase switching signal generator 11, phase switching signals SPDU, SPDV and SPDW are produced in accordance with the decoding signal synchronously with phase switching timing signals obtained from the phase switching timing signal generator 10. Such phase switching signals SPDU, SPDV and SPDW are supplied via the phase switching circuit 13 to the motor driver 15.

Meanwhile in the PWM signal generator 12, a drive signal SPVS produced in accordance with the drive signal parameter from the start parameter register 7 is supplied to the motor driver 15. The motor driver 15 also receives the phase switching signals SPDU, SPDV and SPDW from the phase switching circuit 13 simultaneously with the drive signal SPVS from the PWM signal generator 12, thereby starting the spindle motor 16.

Next, the operation proceeds to step S12 to set ADRS=$875 in response to a command from the CPU 3, whereby a speed follow-up mode is selected. Thereafter the operation proceeds to step S13 to set ADRS=$837, so that start parameters for normally starting the spindle motor 16 are outputted from the start parameter register 7.

According to this embodiment, as described hereinabove, when the spindle motor is started in the start acceleration mode, position signals SPCU, SPCV and SPCW detected from the started spindle motor 16 are supplied, in response to a command from the CPU 3, to the edge detector 1 for detection of the respective edges. Then the rotation frequency signal FG of the spindle motor 16 is outputted from the edge detector 1. Subsequently this rotation frequency signal FG is compared with the preset reference frequency signal FGo in the comparator 2, wherein a decision is made as to whether the rotation frequency fg of the spindle motor 16 has reached the reference frequency fgo within a predetermined time after the start.

And if the result of the decision signifies that the rotation frequency fg of the spindle motor 16 has not yet reached the reference frequency fgo, the switch 5 is turned to its terminal tm in response to a command sent from the CPU 3 on the basis of the abnormal signal outputted from the comparator 2, whereby a manual setting mode is selected and the spindle motor 16 is brought to a stop.

In this state, the operator first adjusts the phase switching time while mutually watching the phase switching control signals SPDU, SPDV, SPDW and the position signals SPCU, SPCV, SPCW on a monitor, thereby executing control to normalize the start of the spindle motor 16. And if the start fails to be normalized by such adjustment, the operator performs fine adjustment of the phase switching number, thereby executing control to normalize the start of the spindle motor 16. In case the start still fails to be normalized even by such adjustment, the operator performs fine adjustment of the drive voltage to thereby recover the normal start state of the spindle motor 16.

Consequently, it becomes possible in the embodiment to achieve proper start of the spindle motor by a simplified structure under optimal target start conditions with low power consumption in compliance with slight changes of the motor characteristics or variations of the driver characteristics while conforming with the type of the motor and the kind of the optical disc.

Thus, according to the structure mentioned above, either a start acceleration mode or a fixed frequency mode is selectively set for the sensorless motor by the mode setting means. And in case the start acceleration mode is selectively set, start parameters for specifying the start-time driving conditions preset correspondingly to the motor characteristic and the driven load are set by the automatic parameter setting means. Then the sensorless motor is started and rotated in the automatic mode on the basis of the start-time driving conditions specified by the starting parameters set by the automatic parameter setting means, and a decision is made by the start state decision means as to whether the start state of the sensorless motor is coincident or not with the target start state. And if the result of the decision signifies that the start state of the sensorless motor has a deviation from the target start state, the setting of the start parameters by the automatic start means is canceled and then is changed to the automatic setting mode, whereby manual adjustment is executed in such a manner that the start parameters give the target start state to the sensorless motor. Therefore, the sensorless motor can be started by such simplified structure for the load with low power consumption under optimal target start conditions in compliance with slight changes of the sensorless motor characteristics or variations of the driver characteristics.

Furthermore, since a phase switching time, a phase switching number and a drive signal are specified as the start parameters, it becomes possible to realize the effects mentioned.

Although the present invention has been described hereinabove with reference to a preferred embodiment thereof, it is to be understood that the invention is not limited to such an embodiment alone, and a variety of other changes and modifications will be apparent to those skilled in the art without departing from the spirit of the invention.

The scope of the invention, therefore, is to be determined solely by the appended claims.

What is claimed is:

1. A sensorless motor starting system comprising:

a mode setting means for selectively setting either a start acceleration mode or a fixed frequency mode for the sensorless motor;

an automatic parameter setting means for setting, in said sensorless motor, start parameters to specify the start-time driving conditions preset correspondingly to the motor characteristic and a load to be driven;

an automatic motor starting means for starting the rotation of said sensorless motor in an automatic mode on the basis of the start-time driving conditions specified by the start parameters set by said automatic parameter setting means;

a start state decision means for making a decision as to whether the start state of said sensorless motor started by said automatic motor starting means is coincident or not with a target start state; and a start parameter setting mode change means for canceling the start executed by said automatic motor starting means when the result of the decision obtained from said start state decision means signifies a deviation of the sensorless motor start state from the target start state, and then changing the setting of the start parameters to a manual setting mode.

2. The sensorless motor driving system according to claim 1, wherein said start parameters specify a phase switching time, a phase switching number and a drive signal.

* * * * *